(12) United States Patent
Luzader et al.

(10) Patent No.: US 11,066,177 B2
(45) Date of Patent: Jul. 20, 2021

(54) CANOPY SUPPORT APPARATUS

(71) Applicant: GOODRICH CORPORATION, Charlotte, NC (US)

(72) Inventors: Michael A. Luzader, Laveen, AZ (US); Timothy C. Haynes, Prescott Valley, AZ (US)

(73) Assignee: Goodrich Corporation, Charlotte, NC (US)

( * ) Notice: Subject to any disclaimer, the term of this patent is extended or adjusted under 35 U.S.C. 154(b) by 92 days.

(21) Appl. No.: 16/571,971

(22) Filed: Sep. 16, 2019

(65) Prior Publication Data
US 2021/0078713 A1 Mar. 18, 2021

(51) Int. Cl.
*B64D 25/14* (2006.01)
*B63C 9/04* (2006.01)
*F16K 15/20* (2006.01)

(52) U.S. Cl.
CPC .............. *B64D 25/14* (2013.01); *B63C 9/04* (2013.01); *F16K 15/202* (2013.01); *B63C 2009/044* (2013.01)

(58) Field of Classification Search
CPC ..... B64D 25/14; B63C 9/02; B63C 2009/026; B63C 9/03; B63C 2009/035; B63C 9/04; B63C 2009/042; B63C 2009/044; B63C 2009/046; B63C 2009/048; F16K 15/147; F16K 15/202
See application file for complete search history.

(56) References Cited

U.S. PATENT DOCUMENTS

| 3,034,154 A | * | 5/1962 | Silverstone | B63C 9/02 441/38 |
| 3,464,515 A | * | 9/1969 | Evans | B64D 25/14 182/20 |
| 3,833,088 A | * | 9/1974 | Chacko | B64D 25/14 182/48 |
| 4,332,049 A | | 6/1982 | Fisher | |
| 4,828,520 A | | 5/1989 | Baughman et al. | |
| 5,711,691 A | * | 1/1998 | Damask | A63H 27/10 137/512.15 |
| 10,233,666 B2 | * | 3/2019 | Haynes | B64D 25/18 |
| 2018/0079513 A1 | * | 3/2018 | Volny | B64D 25/14 |

FOREIGN PATENT DOCUMENTS

GB 833385 4/1960

* cited by examiner

*Primary Examiner* — Ajay Vasudeva
(74) *Attorney, Agent, or Firm* — Snell & Wilmer L.L.P.

(57) ABSTRACT

An evacuation system may comprise a packboard, an evacuation slide configured to deploy from the packboard, and a canopy support apparatus is disclosed. The canopy support apparatus may comprise a valve extending from a proximal end of a canopy support tube toward a distal end of the canopy support tube and into an internal cavity of the canopy support tube. The valve may be configured to open a channel during inflation. The valve may be configured to seal the channel via internal pressure in the internal cavity acting on a sealing component of the valve when the canopy support tube is in an inflated state.

10 Claims, 6 Drawing Sheets

CANOPY SUPPORT APPARATUS

FIELD

The present disclosure relates to aircraft evacuation systems and, in particular, to an evacuation slide having a canopy support apparatus.

BACKGROUND

Emergency evacuation systems, including inflatable evacuation slides, may be used to exit an aircraft absent a jet way or other suitable means of egress for passengers. The evacuation slides may deploy, for example, from the side of an aircraft fuselage. In the event of a water landing, the inflatable evacuation slide may be employed as a life raft. A canopy for providing shelter, after a water landing, may be included with the evacuation system, as set forth by various governmental agencies. Current canopy designs tend to employ a waterproof canopy, which can be tied or otherwise secured to the slide/raft, and canopy support apparatuses configured to provide distance between the canopy and the sliding surface. The canopy support tubes may be integral to the side rails of the slide/raft such that the support tubes inflate upon inflation of the slide and/or the canopy supports apparatuses may be distinct components that are manually attached to the slide and orally inflated by an evacuee. The canopy support apparatus tends to contain an inflation feature which may be costly and may occupy additional volume in the evacuation system.

SUMMARY

A canopy support apparatus is disclosed herein. The canopy support apparatus comprises: a canopy support tube including a proximal end, a distal end, and an internal cavity; and a valve extending from the proximal end towards the distal end into the internal cavity, the valve comprising a channel and a self-sealing component, the self-sealing component configured to seal the channel when the canopy support tube is in an inflated state.

In various embodiments, the canopy support apparatus further comprises an inflating component coupled to the valve at an inlet to the valve, the inflating component comprising a first tab. The first tab may comprise a fastening feature. The inflating component may further comprise a second tab disposed opposite the first tab. The inlet is disposed between the first tab and the second tab. The channel is configured to expand when air is blown through the inlet. The first tab may be configured to be coupled to an evacuation slide. The canopy support apparatus may further comprise a canopy fastening feature configured to be coupled to a canopy of an evacuation system. An internal pressure may act on the self-sealing component to seal the channel when the canopy support tube is in the inflated state.

An evacuation system is disclosed herein. The evacuation system comprises: packboard; an evacuation slide configured to deploy from the packboard; and a canopy support apparatus comprising a canopy support tube and a valve disposed within the canopy support tube, the canopy support tube comprising a proximal end, a distal end, and an internal cavity, the valve extending from the proximal end toward the distal end and into the internal cavity, the valve configured to seal the internal cavity when the canopy support tube is in an inflated state.

In various embodiments, the evacuation slide further comprises a center tube, the canopy support apparatus configured to attach to the center tube. The evacuation system may further comprise a plurality of the canopy support apparatus. The evacuation system may further comprise a plurality of canopy supports coupled to a first rail of the evacuation slide and a second rail of the evacuation slide. The plurality of canopy supports may be integrally formed and in fluid communication with the first rail and the second rail. The canopy support apparatus may further comprise an inflating component coupled to the valve at an inlet to the valve, the inflating component comprising a first tab. The first tab may comprise a fastening feature. The inflating component may further comprise a second tab disposed opposite the first tab. A channel of the valve may be configured to expand when air is blown through the inlet.

A method of using a canopy support apparatus is disclosed herein. The method comprises: pulling a first tab and a second tab of an inflation component of the canopy support apparatus in opposite directions; expanding a channel in a valve, the valve disposed in an internal cavity of a canopy support tube, the expanding occurring by blowing air into an inlet of the valve of the canopy support apparatus; sealing the channel in the valve by an internal pressure in the internal cavity of the canopy support tube acting on a sealing component of the valve. In various embodiments, the method further comprises attaching the first tab and the second tab to an evacuation slide.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Throughout the present disclosure, like reference numbers denote like elements. Accordingly, elements with like element numbering may be shown in the figures, but may not be necessarily repeated herein for the sake of clarity. As used herein, "proximate" refers to a direction inward, or generally, towards the reference component.

Evacuation systems of the present disclosure may include inflatable slides having a canopy support system. The canopy support system may comprise a plurality of canopy supports. The plurality of canopy supports may comprise a canopy support apparatus that are configured to be releasably coupled to an evacuation slide of the evacuation system. Each canopy support apparatus may be inflatable through an inflation inlet on a first end of the canopy support apparatus, the first end having a self-sealing component disposed within the canopy support apparatus. Thus, the canopy support apparatus may be manually inflated by an evacuee of an aircraft and seal automatically after inflation. The first end may also comprise a fastening feature disposed at the first end and configured to couple the canopy support apparatus to an inflatable slide. The canopy support apparatus may be an inexpensive, easy to use alternative to typical canopy support apparatuses.

Figure 1A:
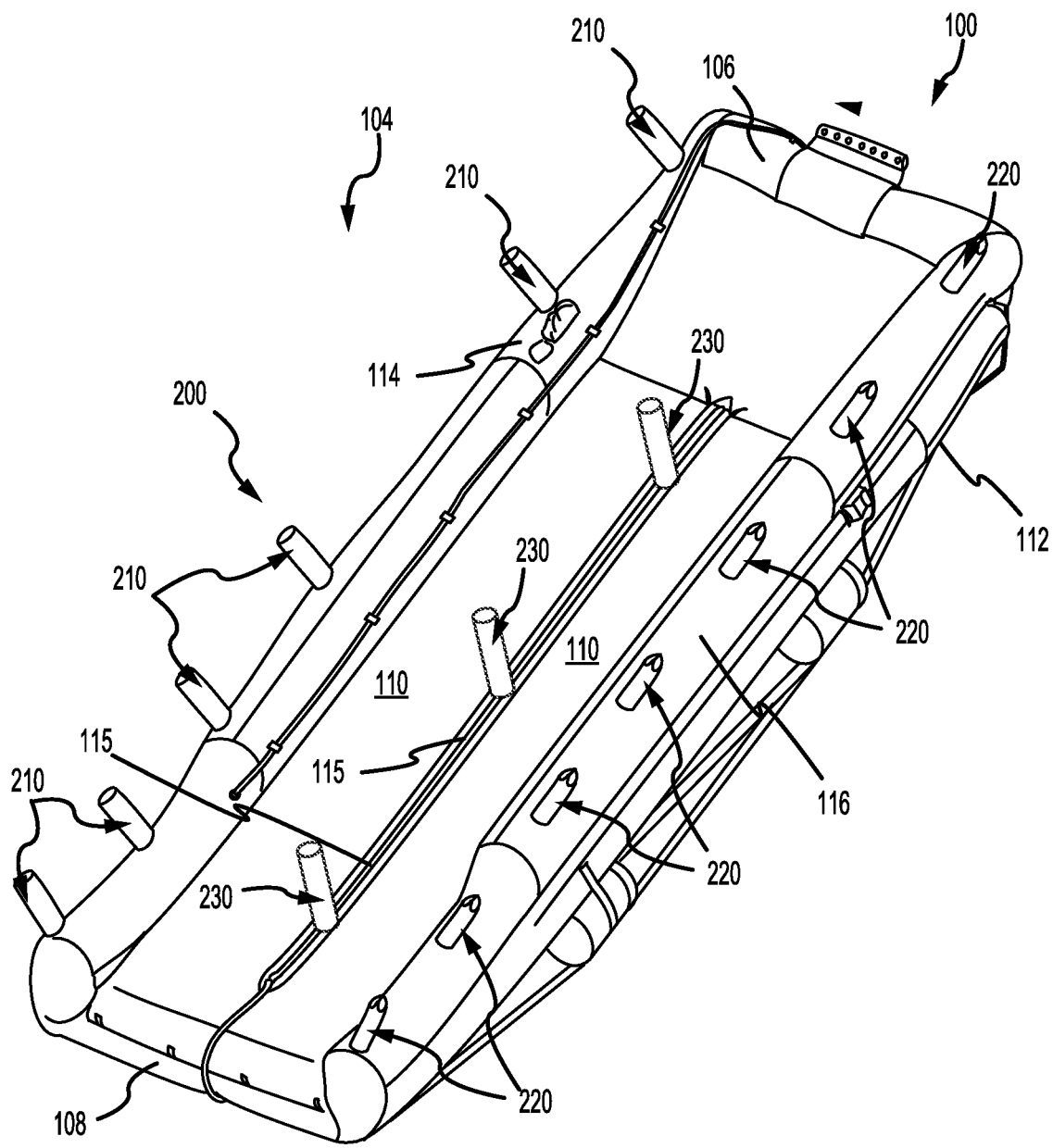
FIG. 1A illustrates a perspective view of an evacuation slide in a deployed position, in accordance with various embodiments.

With reference to FIG. 1A, an evacuation system 100 is illustrated, in accordance with various embodiments. Evacuation system 100 may comprise an evacuation slide 104. FIG. 1 illustrates evacuation slide 104 in an inflated and/or deployed position. Evacuation slide 104 may be deployed from an aircraft. Evacuation slide 104 may comprise an inflatable slide. Evacuation slide 104 may comprise a head end 106 and a toe end 108 opposite head end 106. Head end 106 may be coupled to an aircraft structure. Upon deployment, toe end 108 may contact an exit surface (e.g., the ground or the water) in response to evacuation slide 104 being deployed. In the event of a water landing, evacuation slide 104 may be uncoupled from the aircraft structure and serve as a life raft.

Figure 2:
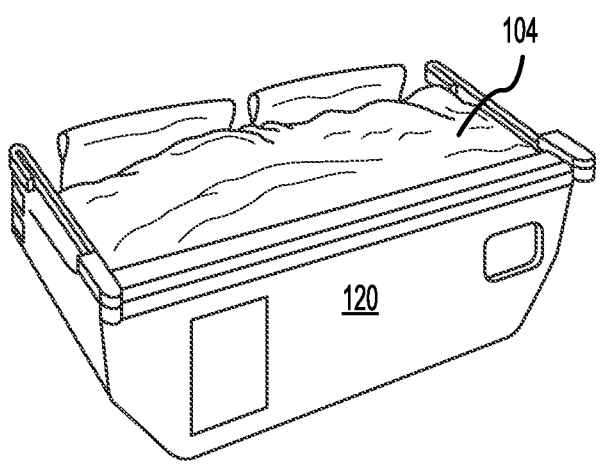
FIG. 2 illustrates a perspective view of an evacuation slide in a stowed position, in accordance with various embodiments.

Referring to FIG. 2, evacuation slide 104 is illustrated in a stowed and/or packed position. In this regard, evacuation slide 104 may be stowed in a packboard 120. In various embodiments, evacuation slide 104 may be folded in the stowed position. In various embodiments, evacuation slide 104 may be deployed from packboard 120 in response to opening an emergency exit door. Packboard 120 may be coupled to an aircraft in an installed position. Typically, a packboard 120 includes a blow-out panel which opens in response to deployment of evacuation slide 104 and through which the inflatable slide may exit the packboard 120. In this regard, evacuation slide 104 may be configured to be deployed from an aircraft.

Returning to FIG. 1A, evacuation slide 104 may comprise a sliding surface 110 and an underside surface 112 opposite sliding surface 110. Sliding surface 110 may extend from head end 106 to toe end 108. Evacuation slide 104 may comprise a first side rail 114, a second side rail 116, and a center tube 115 parallel and disposed between first side rail 114 and second side rail 116. First side rail 114 and second side rail 116 may be disposed on opposing sides of evacuation slide 104 and may extend from head end 106 to toe end 108. First side rail 114, second side rail 116, and center tube 115 may be integrally formed and in fluid communication. Stated differently, first side rail 114 and second side rail 116 may be part of a one interconnected chamber that fills with gas upon deployment of evacuation slide 104.

Evacuation system 100 comprises a canopy support system 200. The canopy support system may comprise a first plurality of canopy supports 210 disposed on first side rail 114, a second plurality of canopy supports 220 disposed on second side rail 116, and a third plurality of canopy supports 230 disposed on center tube 115. In various embodiments, the first plurality of canopy supports 210, the second plurality of canopy supports 220, first side rail 114, second side rail 116, and center tube 115 are integrally formed and in fluid communication. In various embodiments, each canopy support in the first plurality of canopy supports 210, the second plurality of canopy supports 220, and the third plurality of canopy supports 230 are distinct components and releasably coupled to the evacuation slide 104.

Figure 1B:
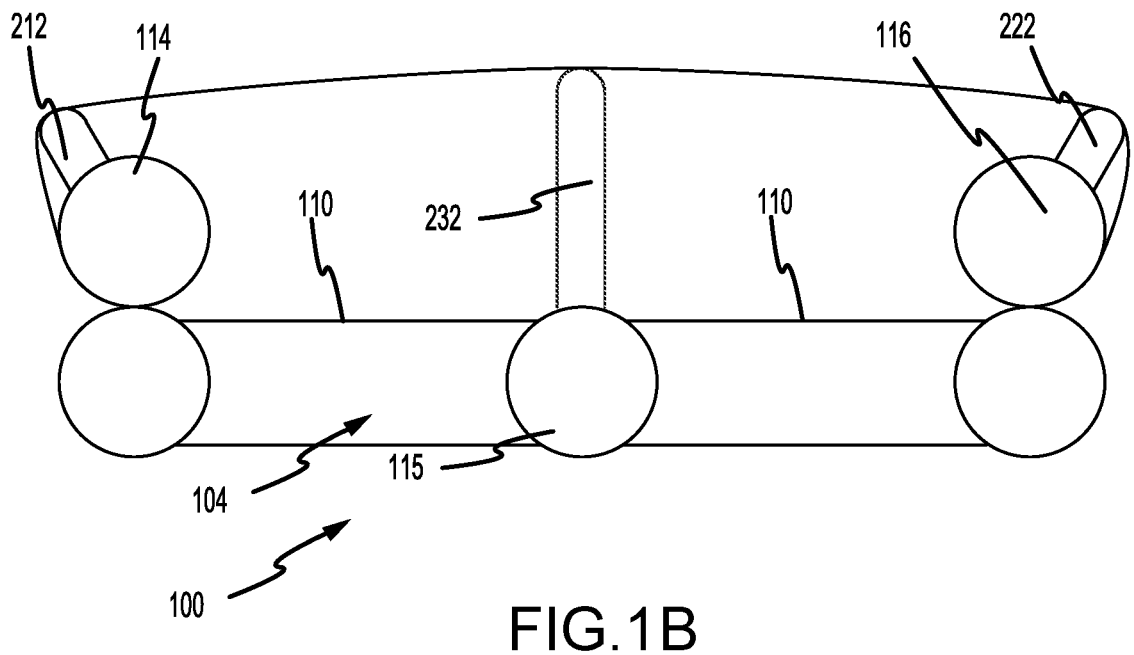
FIG. 1B illustrates a side view of an evacuation slide in a deployed position, in accordance with various embodiments.

Referring now to FIG. 1B, a cross-sectional view of an evacuation system 100, in accordance with various embodiments, is illustrated. The evacuation system comprises evacuation slide 104 in a floating configuration. A first canopy support 212 in the first plurality of canopy supports 210 (from FIG. 1A) extends from first side rail 114 in a direction away from first side rail 114 and sliding surface 110. Similarly, a second canopy support 222 in the second plurality of canopy supports 220 (from FIG. 1A) extends in a direction away from second side rail 116 and the sliding surface 110. A canopy support apparatus 232 may be releasably coupled to the center tube 115 by any method known in the art, such as by a hook and loop fastener, such as that sold under the mark VELCRO®, or any other fastening feature known in the art. The first canopy support 212, the second canopy support 222 and the canopy support apparatus 232 may all extend to a substantially similar height above sliding surface 110. In various embodiments, a substantially similar height is a height that is equal plus or minus 10%. The first canopy support 212, the second canopy support 222 and the canopy support apparatus may all comprise a canopy fastening feature. The canopy fastening feature may be configured to couple to a canopy in order to provide shelter to evacuees of an aircraft.

Figure 3:
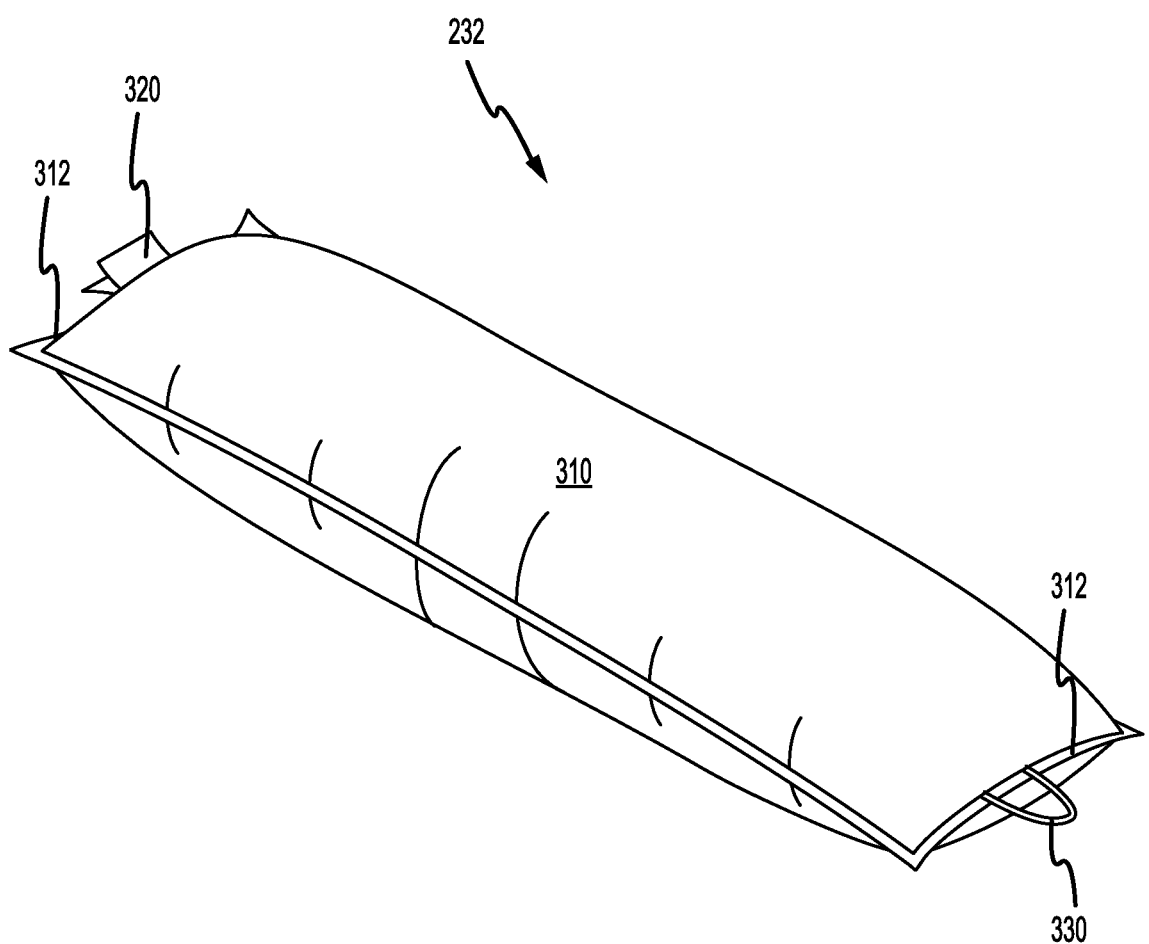
FIG. 3 illustrates a perspective view of a canopy support apparatus, in accordance with various embodiments.

Referring now to FIG. 3, a canopy support apparatus 232 in an inflated state, in accordance with various embodiments, is illustrated. The canopy support apparatus 232 comprises a canopy support tube 310 extending from proximal end 312 to a distal end 314. The canopy support tube 310 may be made of any material known in the art, such as neoprene fabric, urethane fabric, or the like. The canopy support apparatus 232 further comprises an inflating component 320 disposed at the proximal end 312 of the canopy support apparatus 232. The inflating component 320 may be made of any material known in the art, such as neoprene fabric, urethane fabric or the like. The inflating component 320 may be made from the same material as the canopy support tube 310 or a different material. Although depicted at the proximal end 312 of the canopy apparatus, an inflating component 320 may be disposed at any place on the canopy support tube and be within the scope of this disclosure. The canopy support apparatus 232 may further comprise a canopy fastening feature 330 disposed at distal end 314 of the canopy support tube 310. The canopy fastening feature 330 may be a loop, Velcro, or any other canopy fastening feature known in the art.

In various embodiments, the inflating component 320 is configured to allow a user to manually inflate canopy support tube 310 from a deflated state to an inflated state. The inflating component 320 may be configured to seal automatically once the canopy support tube 310 reaches an inflated state by pressure from within the canopy support tube 310. The canopy fastening feature 330 may be configured to couple the canopy support tube 310 to a canopy of an evacuation system.

Figure 4:
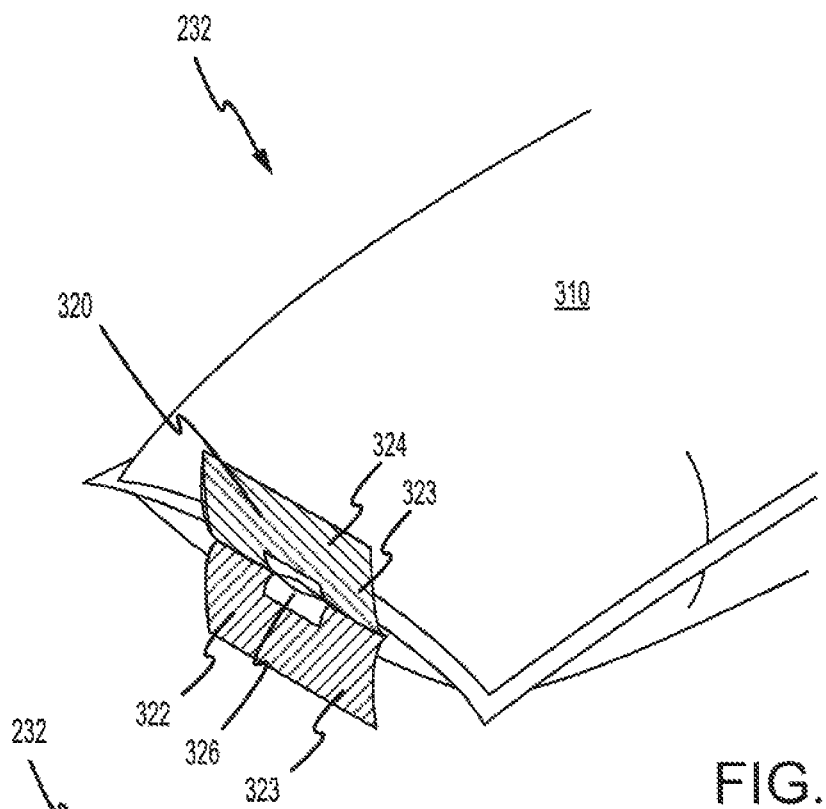
FIG. 4 illustrates a perspective view of a portion of a canopy support apparatus, in accordance with various embodiments.

Referring now to FIG. 4, a portion of a canopy support apparatus 232 including inflating component 320, in accordance with various embodiments, is illustrated. The inflating component 320 may comprise a first tab 322, a second tab 324, and an inlet 326. The first tab 322 and the second tab 324 may be pulled in opposite directions to allow a user to manually inflate the canopy support tube 310 via the inlet 326. The first tab 322 and the second tab 324 may comprise a fastening component 323 configured to couple the canopy support apparatus 232 to an evacuation slide 104 (from FIG. 1A). In various embodiments, the fastening component 323 comprises a hook and loop fastener, such as that sold under the mark VELCRO®, tie-off points, knots, or the like. In various embodiments, the inflating component 320 comprises only a single tab. In various embodiments, the second tab 324 may be bonded to the canopy support tube 310 by any method known in the art.

Figure 5:
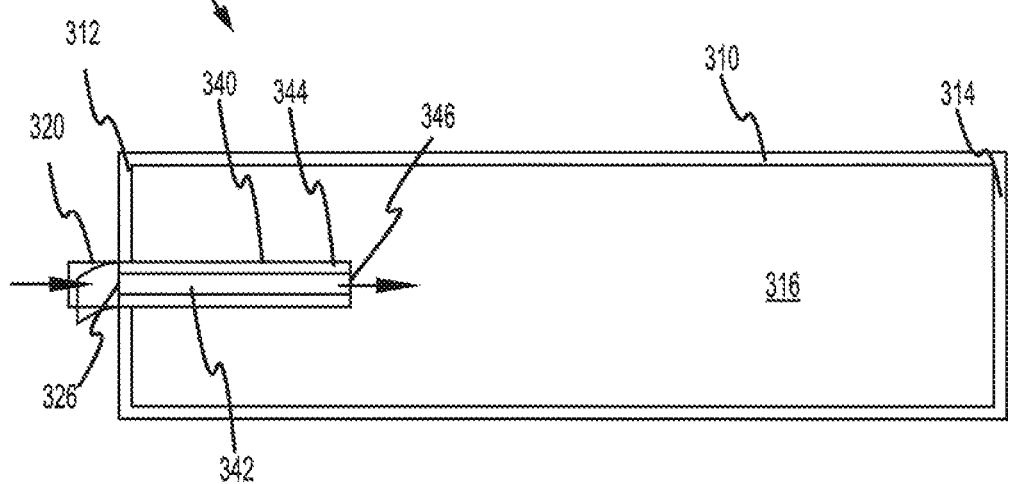
FIG. 5 illustrates a cross-sectional view of a canopy support apparatus, in accordance with various embodiments.

Referring now to FIG. 5, a cross-sectional view of a canopy support apparatus 232 in a deflated state, in accordance with various embodiments, is illustrated. In various embodiments, the canopy support apparatus 232 further comprises a valve 340. The valve 340 extends from the inlet 326 at proximal end 312 toward distal end 314 into an internal cavity 316 of the canopy support tube 310. The valve 340 comprises a channel 342 extending along the length of valve 340 from inlet 326 to a valve outlet 346 opening to internal cavity 316 of the canopy support tube 310. The valve 340 further comprises a self-sealing component 344 surrounding the channel 342. In various embodiments, the self-sealing component 344 is configured to seal the channel 342 upon inflation of the canopy support tube 310. The greater the pressure inside the internal cavity 316 after inflation, the tighter the seal of the valve 340 by the self-sealing component 344. This may ensure that the canopy support apparatus 232 remains inflated during use. In various embodiments, the self-sealing component 344 comprising a channel inner surface defining the channel 342. The channel inner surface is smooth and a first half of the channel inner surface is configured to contact a second half of the channel inner surface to create a seal. In various embodiments, the self-sealing component is a self-sealing fiber-reinforce composite, or any other component that seals upon external pressure being exerted on the self-sealing component.

In various embodiments, the canopy support apparatus 232 may be manufactured in accordance with any method known in the art, such as heat sealing, or the like. In various embodiments, the valve 340 may extend from 5% of a length from the proximal end 312 to the distal end 314 to 90% of the length. In a deflated state, the canopy support apparatus 232 may be essentially flat. The valve 340 may be made of any material known in the art, such as such as neoprene fabric, urethane fabric, or the like.

Figure 6:
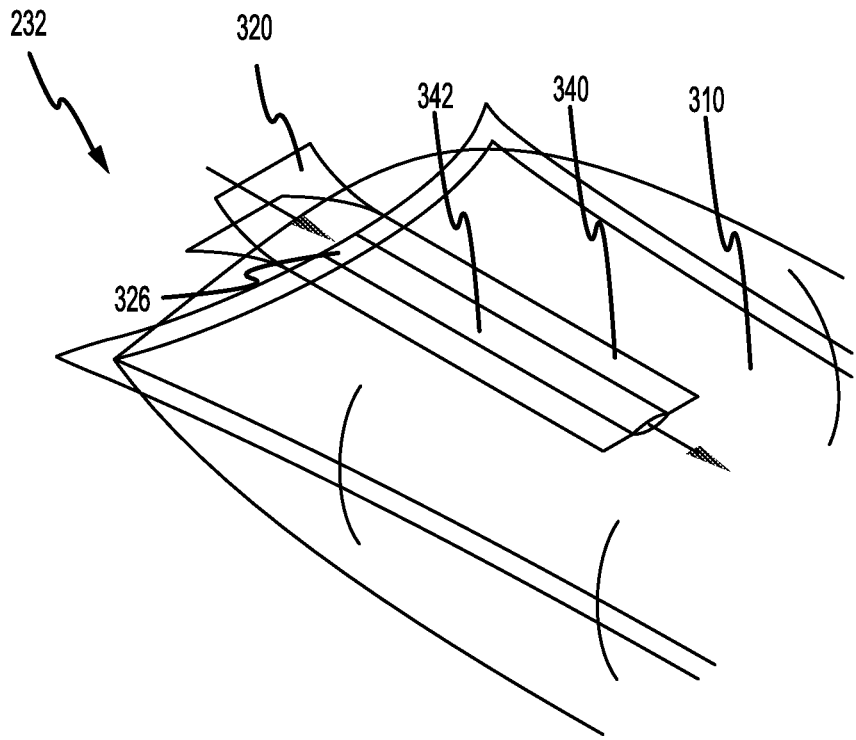
FIG. 6 illustrates a transparent perspective view of a portion of a canopy support apparatus during inflation, in accordance with various embodiments.

Referring now to FIG. 6, a transparent view of a portion of a canopy support apparatus 232 during inflation of the canopy support tube 310, in accordance with various embodiments, is illustrated. Air may be introduced into the inlet 326 of the inflating component 320 which causes the channel 342 to expend allowing air to flow through the channel into internal cavity 316.

Figure 7:
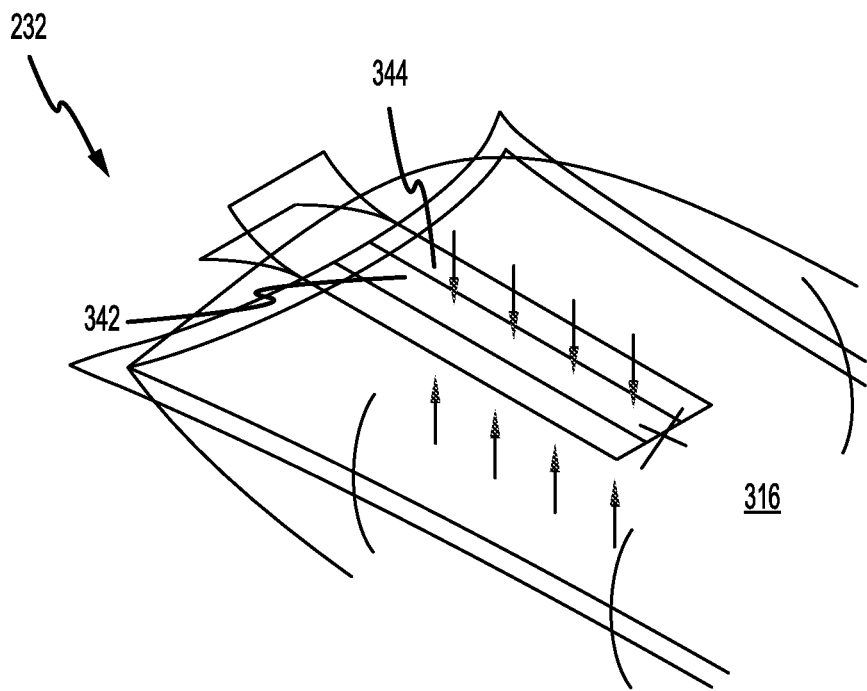
FIG. 7 illustrates a transparent perspective view of a portion of a canopy support apparatus post-inflation, in accordance with various embodiments.

Referring now to FIG. 7, a transparent view of a portion of a canopy support apparatus 232 post-inflation of the canopy support tube 310, in accordance with various embodiments is illustrated. After inflation the air disposed in the internal cavity 316 creates an internal pressure. The internal pressure may press on both sides of the self-sealing component 344 closing and/or sealing the channel 342. This may ensure that the air disposed in internal cavity 316 does not escape during use of the canopy support apparatus 232.

Figure 8:
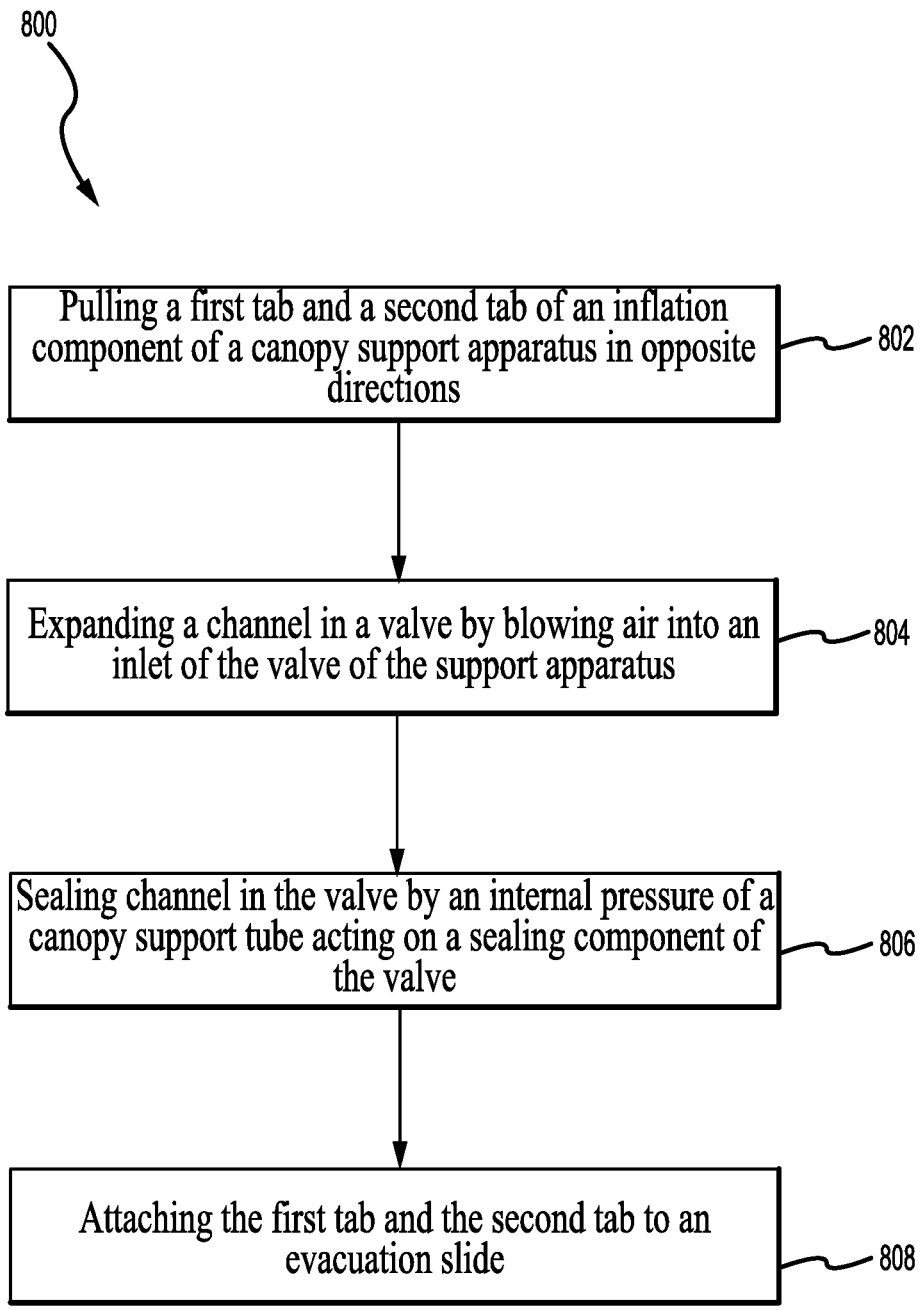
FIG. 8 illustrates a method of using a canopy support apparatus, in accordance with various embodiments.

Referring now to FIG. 8, a method 800 of using a canopy support apparatus, in accordance with various embodiments, is illustrated. The method comprises pulling a first tab and a second tab of an inflation component of a canopy support apparatus in opposite directions (step 802). By pulling the first tab and the second tab in opposite directions, an inlet to a channel of a valve may be exposed. The method 800 further comprises expanding the channel by blowing air into the inlet of the valve (step 804). A canopy support tube of the canopy support apparatus will begin to inflate upon blowing air into the inlet of the valve. Step 804 may be repeated until the canopy support tube reaches and inflated state The method 800 further comprises sealing the channel in the valve by an internal pressure of a canopy support tube acting on a sealing component of the valve (step 806). The internal pressure may act on both sides of the sealing component and/or clamp the channel closed. This may ensure that the air in an internal cavity of canopy support tube may not escape during use. The method 500 may further comprise attaching the first tab and the second tab to an evacuation slide (step 808). The attaching may be done by any method known in the art, such as Velcro, tie-off points, knots, or the like.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation system, comprising:
   a packboard;
   an evacuation slide configured to deploy from the packboard; and
   a canopy support apparatus comprising a canopy support tube and a valve disposed within the canopy support tube, the canopy support apparatus comprising an inflating component coupled to the valve at an inlet to the valve, the inflating component comprising a first tab and a second tab, the first tab and the second tab each comprising a fastening component disposed on an inner surface, the canopy support tube comprising a proximal end, a distal end, and an internal cavity, the valve extending from the proximal end toward the distal end and into the internal cavity, the valve configured to seal the internal cavity when the canopy support tube is in an inflated state.

2. The evacuation system of claim 1, wherein the evacuation slide further comprises a center tube, the canopy support apparatus configured to attach to the center tube.

3. The evacuation system of claim 1, further comprising a plurality of the canopy support apparatus.

4. The evacuation system of claim 3, further comprising a plurality of canopy supports coupled to a first rail of the evacuation slide and a second rail of the evacuation slide.

5. The evacuation system of claim 4, wherein the plurality of canopy supports is integrally formed and in fluid communication with the first rail and the second rail.

6. The evacuation system of claim 1, wherein the canopy support apparatus further comprises an inflating component coupled to the valve at an inlet to the valve, the inflating component comprising a first tab.

7. The evacuation system of claim 6, wherein the first tab comprises a fastening feature.

8. The evacuation system of claim 6, wherein the inflating component further comprises a second tab disposed opposite the first tab.

9. The evacuation system of claim 6, wherein the channel of the valve is configured to expand when air is blown through the inlet.

10. A method of using a canopy support apparatus, comprising:
    pulling a first tab and a second tab of an inflation component of the canopy support apparatus in opposite directions;
    expanding a channel in a valve, the valve disposed in an internal cavity of a canopy support tube, the expanding occurring by blowing air into an inlet of the valve of the canopy support apparatus;
    sealing the channel in the valve by an internal pressure in the internal cavity of the canopy support tube acting on a sealing component of the valve;
    attaching a first surface of the first tab and a second surface of the second tab to an evacuation slide; and
    attaching a distal end of the canopy support apparatus to a canopy.

* * * * *